United States Patent
Watté et al.

(10) Patent No.: US 10,830,970 B2
(45) Date of Patent: Nov. 10, 2020

(54) OPTICAL FIBER ALIGNMENT MECHANISMS METHOD USING 3D PRINTING

(71) Applicant: COMMSCOPE CONNECTIVITY BELGIUM BVBA, Kessel-Lo (BE)

(72) Inventors: Jan Watté, Grimbergen (BE); Danny Willy August Verheyden, Gelrode (BE); Marc Schouteden, Houthalen-Helchteren (BE); Peter Verschraegen, Hoegaarden (BE); Marc Eugène Bervoets, Hasselt (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/725,862

(22) Filed: Dec. 23, 2019

(65) Prior Publication Data

US 2020/0209494 A1    Jul. 2, 2020

Related U.S. Application Data

(63) Continuation of application No. 15/773,937, filed as application No. PCT/EP2016/076694 on Nov. 4, 2016, now Pat. No. 10,564,372.

(60) Provisional application No. 62/252,258, filed on Nov. 6, 2015.

(51) Int. Cl.
| | |
|---|---|
| *G02B 6/42* | (2006.01) |
| *G02B 6/02* | (2006.01) |
| *G02B 6/36* | (2006.01) |
| *G02B 6/38* | (2006.01) |
| *G02B 6/255* | (2006.01) |

(52) U.S. Cl.
CPC ......... *G02B 6/423* (2013.01); *G02B 6/02042* (2013.01); *G02B 6/3652* (2013.01); *G02B 6/3831* (2013.01); *G02B 6/2555* (2013.01)

(58) Field of Classification Search
CPC .. G02B 6/423; G02B 6/02042; G02B 6/3831; G02B 6/3652; G02B 6/2555
See application file for complete search history.

(56) References Cited

U.S. PATENT DOCUMENTS

| | | | |
|---|---|---|---|
| 5,519,801 | A | 5/1996 | Le Noane et al. |
| 6,154,594 | A | 11/2000 | Fiacco et al. |
| 8,457,462 | B2 | 6/2013 | Imamura |
| 9,052,481 | B2 | 6/2015 | Brunner et al. |
| 9,069,143 | B2 | 6/2015 | Bradley et al. |

(Continued)

OTHER PUBLICATIONS

International Search Report and Written Opinion of the International Searching Authority for International Patent Application No. PCT/EP2016/076694 dated Jan. 26, 2017, 13 pages.

*Primary Examiner* — Andrew Jordan
(74) *Attorney, Agent, or Firm* — Merchant & Gould P.C.

(57) ABSTRACT

An optical fiber alignment mechanism (100) operates to align optical fibers (102). The mechanism can include a key element (120, 130) arranged on the cladding (112) of an optical fiber (102). The key element (120, 130) can engage with a corresponding element of another optical fiber (102) to align the cores (108) of the mating optical fibers. The key element (120) of an optical fiber (102) can also be inserted into a corresponding keyway (226) of a fiber alignment hole (222) of a ferrule (200) such that the optical fiber (102) is oriented properly within the ferrule (200).

20 Claims, 11 Drawing Sheets

(56) References Cited

U.S. PATENT DOCUMENTS

| | | |
|---|---|---|
| 9,151,923 B2 | 10/2015 | Nielson et al. |
| 9,482,814 B2 | 11/2016 | Nakanishi et al. |
| 9,568,688 B2 | 2/2017 | Sasaoka |
| 9,804,336 B2 | 10/2017 | Giessen |
| 10,564,372 B2 * | 2/2020 | Watte .................... G02B 6/423 |
| 2001/0026662 A1 | 10/2001 | Chong |
| 2011/0229085 A1 | 6/2011 | Bradley et al. |
| 2012/0219254 A1 | 8/2012 | Bradley et al. |
| 2013/0044978 A1 | 2/2013 | DeDobbelaere et al. |
| 2014/0219609 A1 | 8/2014 | Nielson et al. |
| 2015/0043878 A1 | 2/2015 | Chen et al. |
| 2015/0055923 A1 | 2/2015 | Saito et al. |
| 2015/0078712 A1 | 3/2015 | Brunner et al. |
| 2015/0323736 A1 | 11/2015 | Ishida et al. |
| 2016/0070058 A1 | 3/2016 | Nakanishi et al. |
| 2016/0252683 A1 | 9/2016 | Sasaki |
| 2018/0321449 A1 | 11/2018 | Watte et al. |

\* cited by examiner

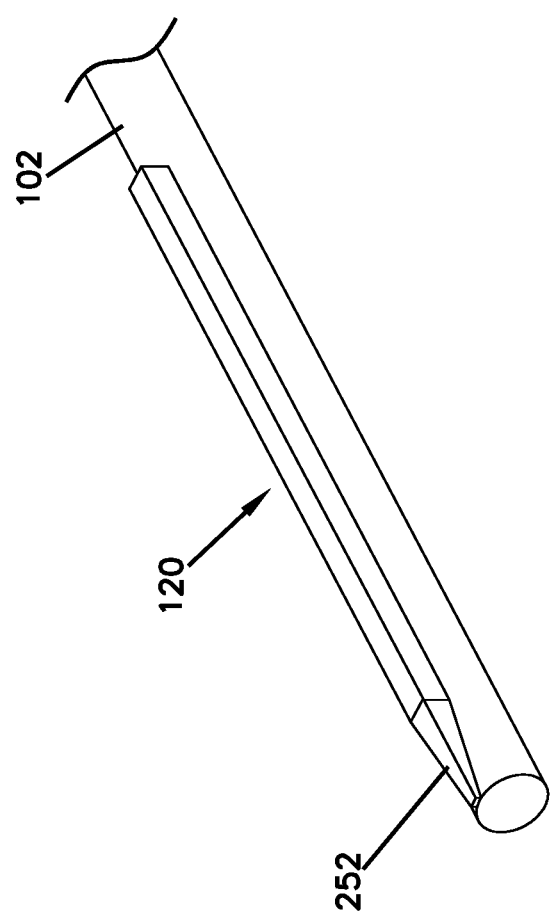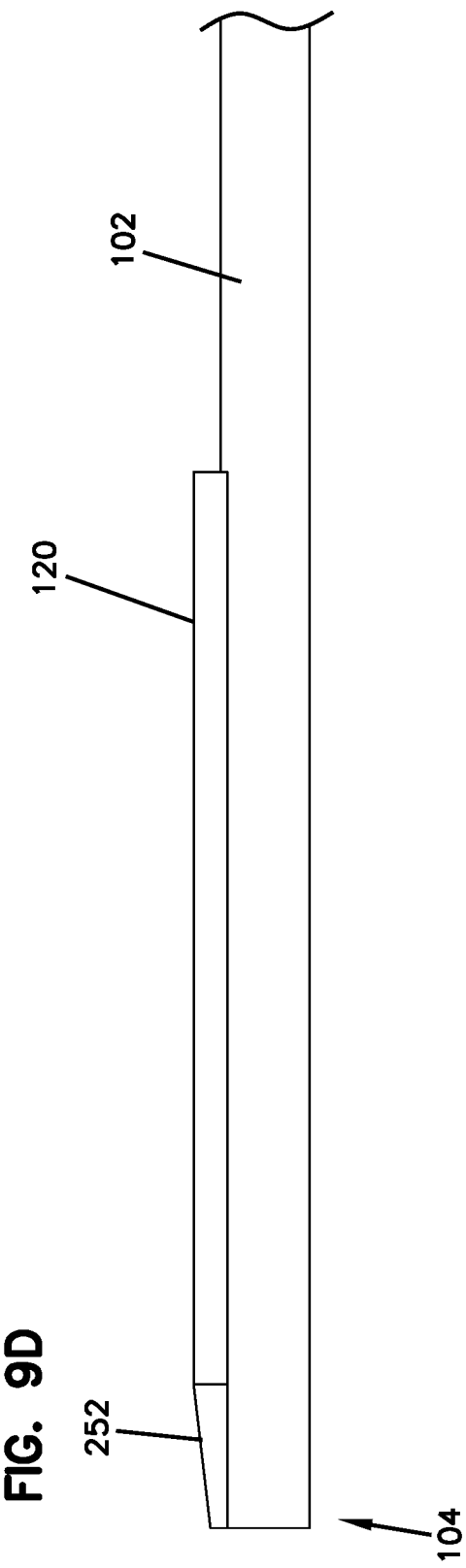

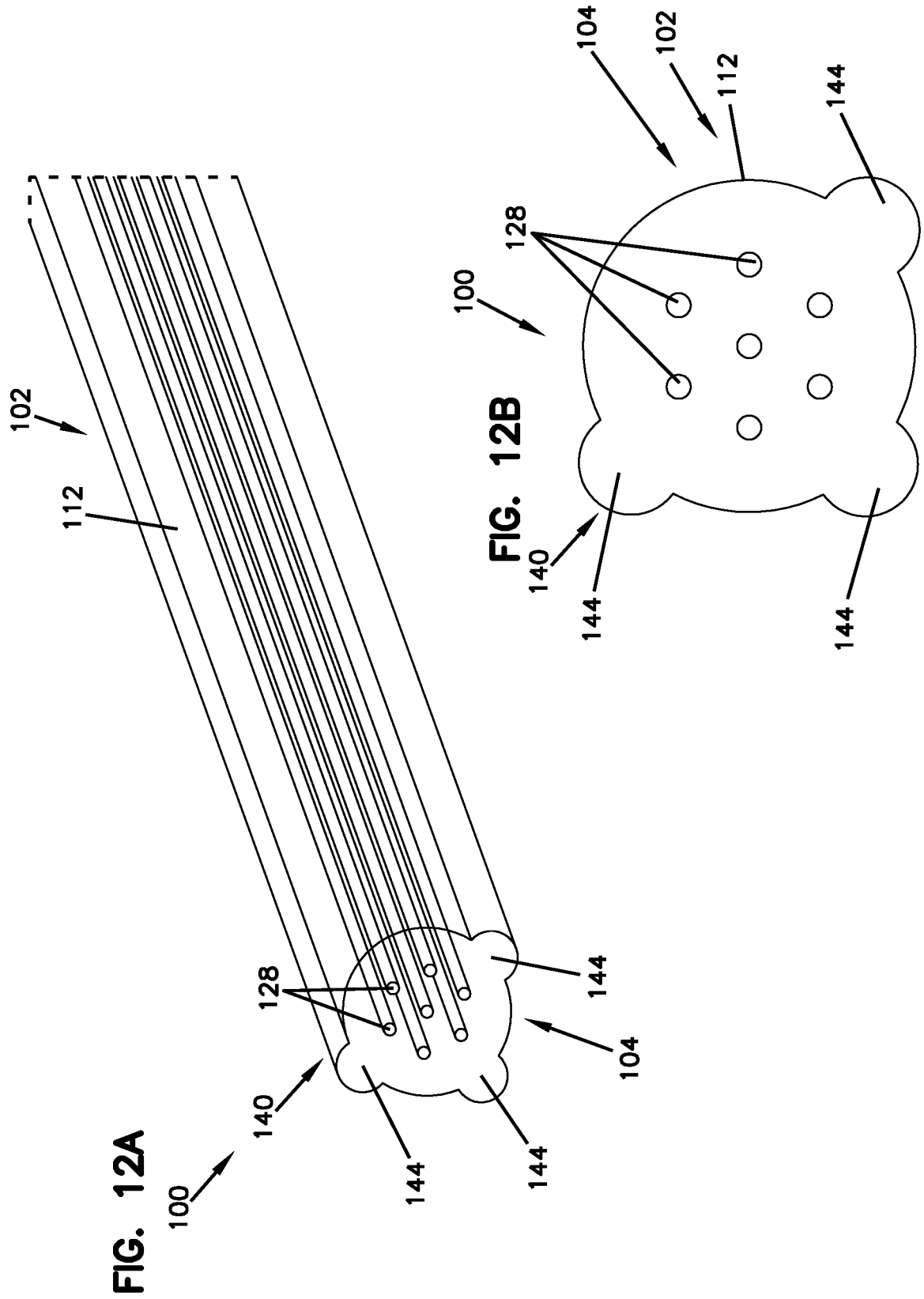

OPTICAL FIBER ALIGNMENT MECHANISMS METHOD USING 3D PRINTING

CROSS-REFERENCE TO RELATED APPLICATION

This application is a Continuation of U.S. patent application Ser. No. 15/773,937, filed on May 4, 2018, now U.S. Pat. No. 10,564,372, which is a National Stage Application of PCT/EP2016/076694, filed on Nov. 4, 2016, which claims the benefit of U.S. Patent Application Ser. No. 62/252,258, filed on Nov. 6, 2015, the disclosures of which are hereby incorporated by reference in their entireties. To the extent appropriate, a claim of priority is made to each of the above disclosed applications.

BACKGROUND

Optical fibers include a core typically formed from glass or plastic and configured to transmit optical signals therethrough. A cladding surrounds the core. When coupling optical fibers, the cores of each fiber must be aligned to enable the optical signals from a first fiber to be transmitted to a second fiber. Failure to properly align the cores of the fibers may result in an improper transmission of the optical signal from the first optical fiber to the second optical fiber. In particular, portions of the optical signal may not be transmitted from the first optical fiber to the second optical fiber. Improper transmissions between the fibers may result in lost data when transmitting the optical signal.

Multi-core optical fibers include a plurality of cores with a cladding surrounding the cores. The use of multi-core optical fibers can significantly increase data-carrying capacity in optical network by allowing a plurality of optical data signals to be carried in parallel by a single fiber. However, splicing two multi-core fibers may be more difficult than the alignment of two single-core fibers because a plurality of cores must be individually aligned between the fibers simultaneously. The complexity involved in identifying and precisely aligning the individual positions of each core of the multi-core fibers can restrict the use of multi-core fibers in telecommunications.

SUMMARY

In general terms, this disclosure is directed to optical fiber alignment mechanisms. In one possible configuration and by non-limiting example, the mechanisms include one or more key elements for aligning multi-core optical fibers. Various aspects are described in this disclosure, which include, but are not limited to, the following aspects.

One aspect is an optical fiber having a first end and a second end. The optical fiber extends along a central longitudinal axis between the first and second ends. The optical fiber further includes one or more cores, a cladding, and a key element. The cores are configured to transmit optical signals between the first end and the second end. Each of the cores has an end surface at the first end. The end surface is configured to face an end of a corresponding core of another optical fiber. The cladding is positioned around a circumference of the cores. The key element is arranged on the cladding and configured to engage with a corresponding element to align the cores with corresponding cores of the mating optical fiber. In certain examples, the key element includes a 3D-printed element on the cladding. The key element may be arranged on the cladding adjacent the first end of the optical fiber. In certain examples, the key element may include a male key element protruding from the cladding. In certain examples, the key element may include a female key element including a recess portion.

Another aspect is a method of manufacturing the optical fiber as described above. The method may include providing a cladding around a circumference of one or more cores; and providing a key element on the cladding. One example key element is a 3-D printed key element printed on the cladding.

Yet another aspect is a fiber optic system including a first optical fiber and a fiber optic ferrule. The first optical fiber includes one or more first cores for transmitting optical signals, a first cladding positioned around the cores, and a first key element arranged on the first cladding. The fiber optic ferrule includes a ferrule body and at least one fiber alignment hole provided in the ferrule body. The fiber alignment hole is configured to support at least a portion of the first optical fiber and includes a keyway configured to receive the first key element of the first optical fiber when the first optical fiber is received to the fiber alignment hole.

In certain examples, the fiber optic system may further include a second optical fiber. The second optical fiber includes one or more second cores for transmitting optical signals, a second cladding positioned around the cores; and a second key element arranged on the second cladding and configured to engage with the first key element to align the second cores with the first cores. In certain examples, the first and second key elements include a 3D-printed element on the first and second claddings, respectively. Other key elements can be used, and can be added by other methods.

The above features and advantages and other features and advantages of the present teachings are readily apparent from the following detailed description for carrying out the present teachings when taken in connection with the accompanying drawings.

BRIEF DESCRIPTION OF THE DRAWINGS

FIG. 9A is a schematic perspective view of another example of the male key element of the optical fiber alignment mechanism in accordance with the present disclosure.

FIG. 9D is a schematic side view of the male key element of FIG. 9A.

FIG. 12A schematically illustrates yet another exemplary embodiment of the optical fiber alignment mechanism in accordance with the present disclosure.

FIG. 12B is a schematic cross-sectional view of the optical fiber of FIG. 12A.

DETAILED DESCRIPTION

Figure 1:
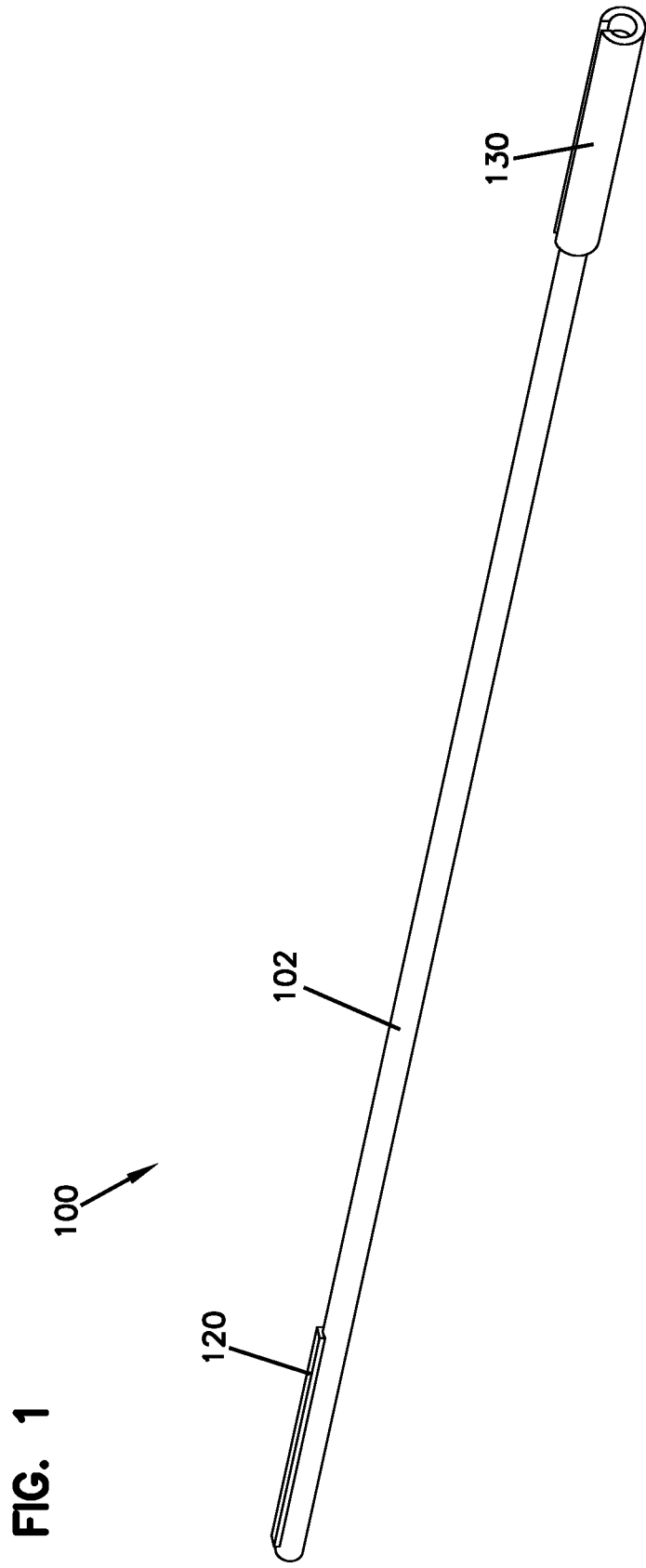
FIG. 1 is a schematic perspective view of an optical fiber alignment mechanism in accordance with an exemplary embodiment of the present disclosure.

Various embodiments will be described in detail with reference to the drawings, wherein like reference numerals represent like parts and assemblies throughout the several views.

Referring to FIGS. 1-4, an exemplary embodiment of an optical fiber alignment mechanism is described and illustrated in accordance with the present disclosure.

Figure 2:
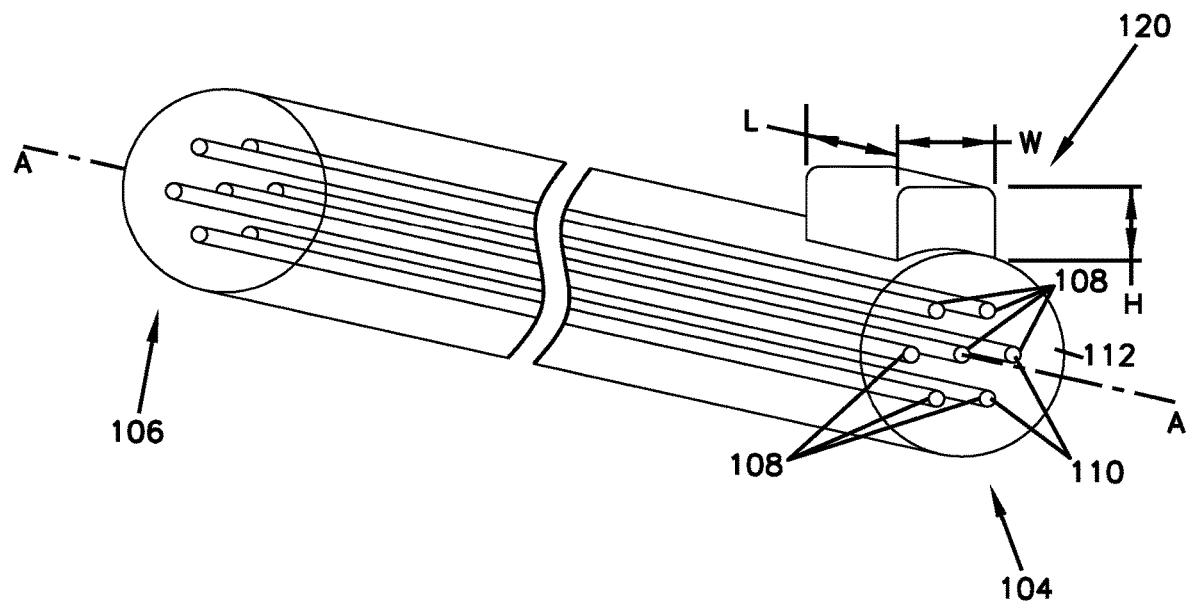
FIG. 2 is a schematic perspective view of an example embodiment of a key element of the optical fiber alignment mechanism of FIG. 1.
Figure 3:
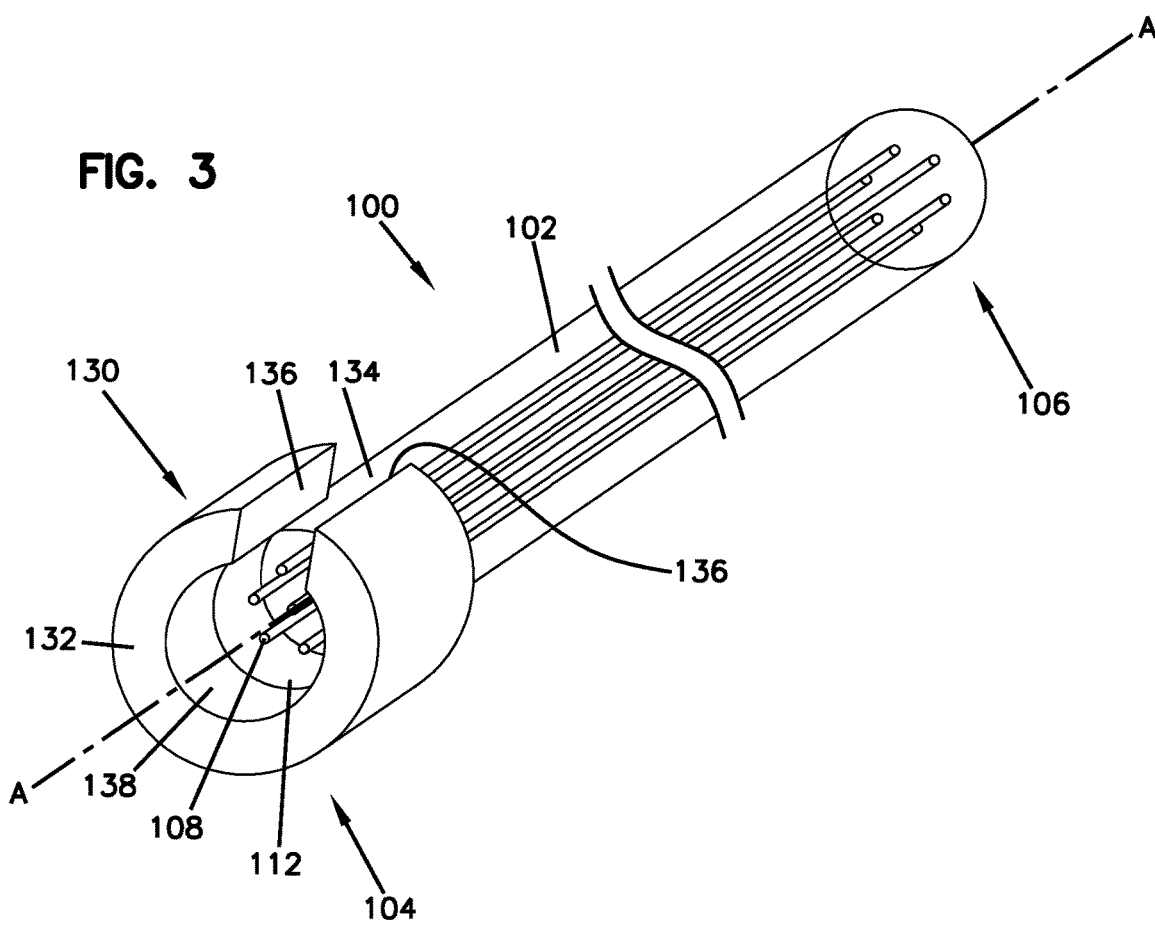
FIG. 3 is a schematic perspective view of another example embodiment of a key element of the optical fiber alignment mechanism of FIG. 1.

The optical fiber alignment mechanism 100 is implemented with an optical fiber 102. As illustrated in FIGS. 2 and 3, the optical fiber 102 includes a first end 104 and a second end 106 between which the optical fiber 102 extends along a central longitudinal axis A. In this example, the optical fiber 102 is a multi-core fiber, which includes a plurality of cores 108 for transmitting optical signals between the first end 104 to the second end 106. Each of the cores 108 has an end face 110 at the first end 104, which is configured to face an end face of a corresponding core 108 of another optical fiber 102 that is spliced together. The fiber 102 includes a cladding 112 positioned around a circumference of the cores 108, thereby surrounding the cores 108.

In the illustrated example, the multi-core fiber 102 includes seven cores symmetrically arranged in the fiber. However, it will be appreciated that the present disclosure may also be practiced using other types of multi-core fibers, including multi-core fibers having different numbers of cores, different types of cores or claddings, and different core configurations, which may or may not be symmetric with respect to the fiber axis. Further, the multi-core fibers can be twisted such that each of its cores forms a helix within the fiber around the fiber axis.

Although the optical fiber alignment mechanisms of the present disclosure are primarily described herein with respect to multi-core optical fibers, it will be appreciated that the present disclosure may also be implemented with single-core optical fibers.

Figure 4:
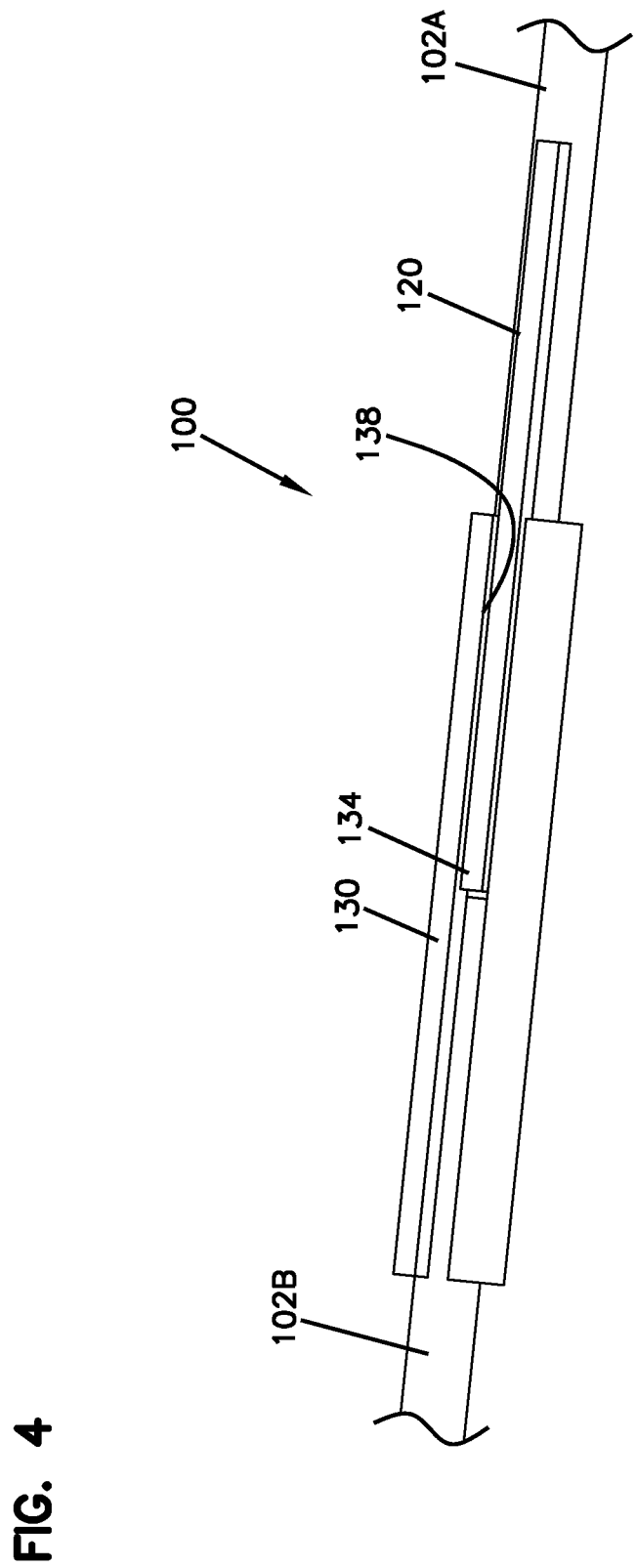
FIG. 4 schematically illustrates an example engagement of two corresponding key elements of the optical fiber alignment mechanism of FIG. 1.
Figure 6:
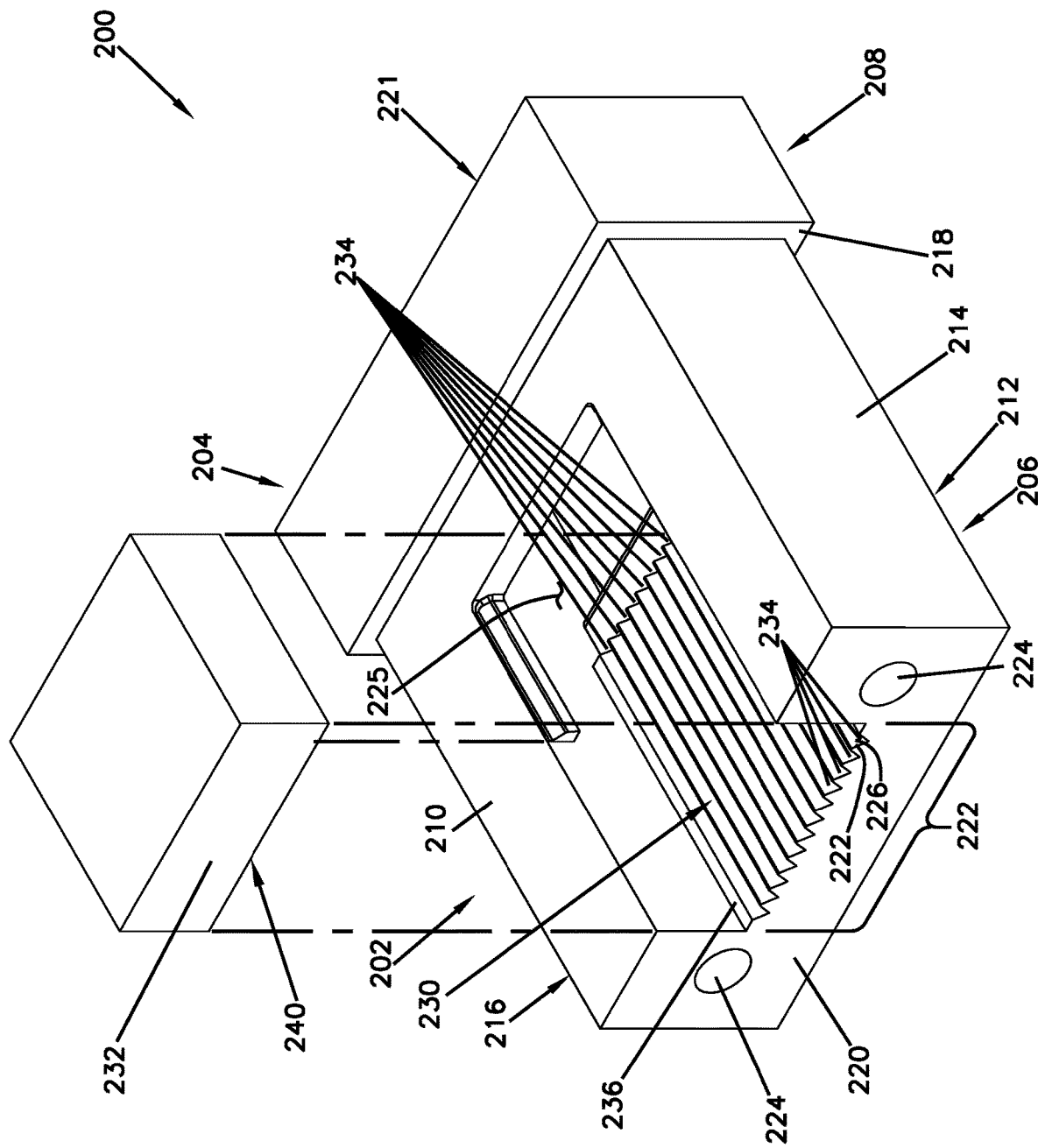
FIG. 6 is a schematic perspective view of the fiber optic ferrule of FIG. 5 with a cover portion separated.

With reference to FIG. 2, the optical fiber alignment mechanism 100 includes a first key element 120 configured to align cores of two mating optical fibers 102 when the optical fibers 102 are spliced as illustrated in FIG. 4. In other examples, the key element 120 can also be used to align the optical fiber 102 with a fiber optic ferrule as illustrated in FIG. 6.

Figure 5:
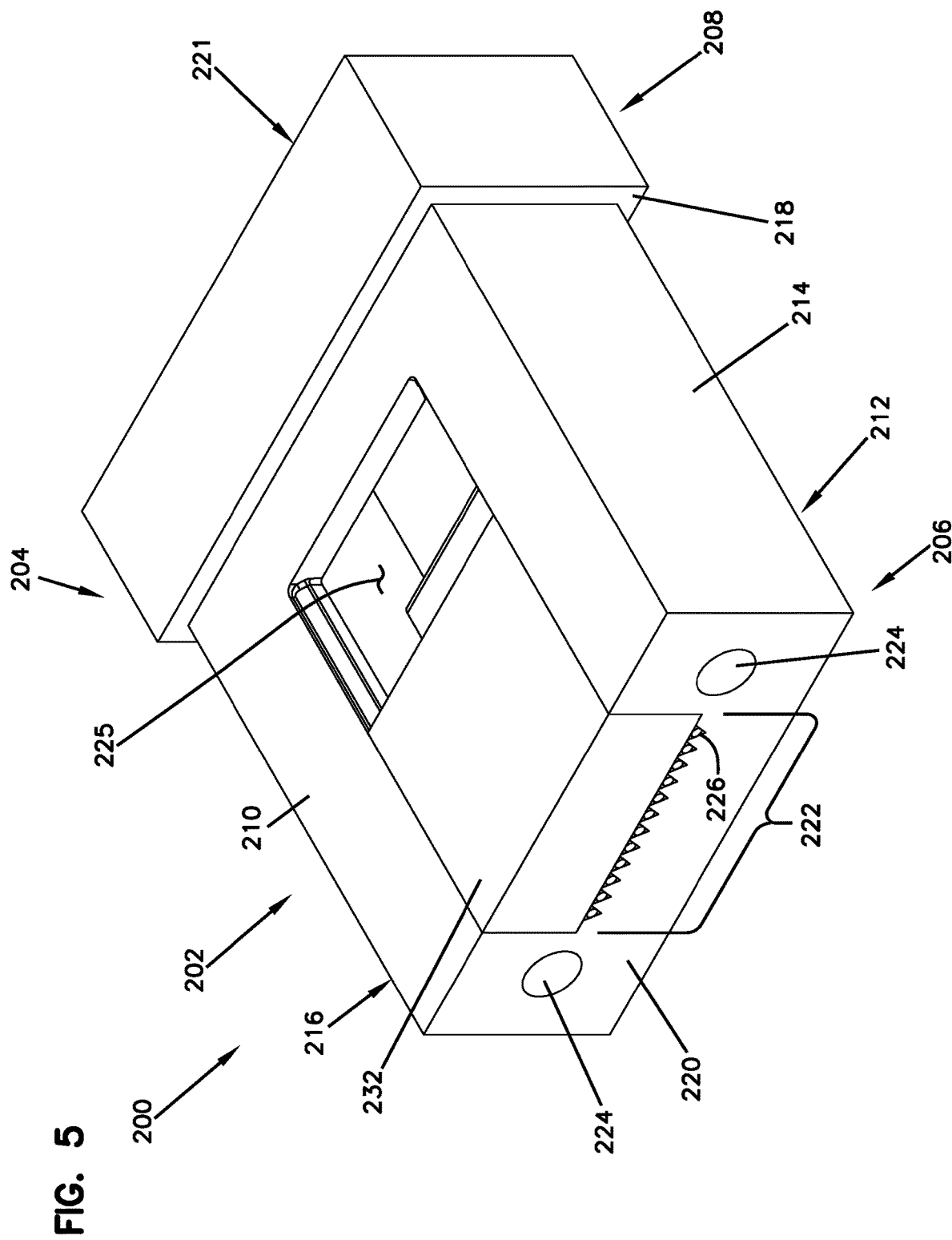
FIG. 5 is a schematic perspective view of a fiber optic ferrule of the optical fiber alignment mechanism in accordance with an exemplary embodiment of the present disclosure.

The key element 120 is arranged on the fiber 102 and configured to engage with a corresponding element of a mating optical fiber 102 to align the cores with corresponding cores of the mating optical fiber 102. In some examples, such a corresponding element is a second key element 130 as described below. In other examples, the key element 120 is configured to engage with a corresponding feature of a fiber alignment hole 222 of a ferrule 200 (FIG. 5).

The key element 120 can be directly printed on the cladding 112. In some examples, the key element 120 is formed on the cladding 112 by 3D-printing. In some examples, two photon polymerization 3D printing can be used to print the key element 120 on the cladding 112. A dip-in two photon polymerization 3D printing can be employed. For example, a high numerical aperture (NA) microscopic objective can be brought into contact with a photoresist (e.g., solvent free photoresist) that is dispensed onto the fiber. Through irradiation by the laser of the 3D printing device, the photoresist can polymerize, allowing achieving key features of different shapes. To match the properties of the glass fiber onto which the key element is printed, inorganic-organic hybrid polymers can be used. One example of such inorganic-organic hybrid polymers is available from ORMOCER. Other key elements 120 can be used, and can be added by other methods. By way of example, the key elements 120 can be attached on the cladding 112 with one or more adhesives.

In some examples, the key element 120 is a male key element protruding from the cladding 112. For example, the key element 120 is a projection protruded from an outer surface of the cladding 112 with a predetermined dimension. For example, the key element 120 is shaped substantially as a rectangular or square block with predetermined height (H), width (W), and length (L). Other shapes are possible in other examples, such as shown in FIGS. 8, 9A-9D, and 12A-12B. In the illustrated example, the key element 120 includes a single male key element. Other examples of the key element 120 include a plurality of male key elements formed around the cladding 112. In some examples, the key element 120 is provided adjacent the first end 104 of the fiber 102. In other examples, the key element 120 is provided at other locations on the fiber 102.

With reference to FIG. 3, the optical fiber alignment mechanism 100 includes a second key element 130 configured to align cores of two mating optical fibers 102 when the optical fibers 102 are spliced as illustrated in FIG. 4.

Similarly to the first key element 120, the second key element 130 is arranged on the fiber 102 and configured to engage with a corresponding element to align the cores with corresponding cores of a mating optical fiber 102. In some examples, such a corresponding element is the first key element 120 as illustrated in FIG. 4.

The second key element 130 can be directly printed on the cladding 112. In some examples, the key element 130 is formed on the cladding 112 by 3D-printing. In some examples, two photon polymerization 3D printing can be used to print the key element 120 on the cladding 112. A dip-in two photon polymerization 3D printing can be employed. For example, a high numerical aperture (NA) microscopic objective can be brought into contact with a photoresist (e.g., solvent free photoresist) that is dispensed onto the fiber. Through irradiation by the laser of the 3D printing device, the photoresist can polymerize, allowing achieving key features of different shapes. To match the properties of the glass fiber onto which the key element is printed, inorganic-organic hybrid polymers can be used. One example of such inorganic-organic hybrid polymers is available from ORMOCER. Other key elements 130 can be used, and can be added by other methods. By way of example, the key elements 130 can be attached on the cladding 112 with one or more adhesives.

In some examples, the key element 130 is a female key element arranged around the cladding 112. For example, the female key element 130 includes a base portion 132 arranged partially around the outer surface of the cladding 112, and a recess portion 134 (also referred to herein as a key recess portion) defined by opposing end surfaces 136 of the base portion 132. Further, the female key element 130 includes a fiber receiving portion 138 configured to receive a portion of a mating optical fiber 102. In the illustrated example, the fiber receiving portion 138 is defined by a portion of the base portion 132 that extends from the first end 104 of the fiber 102 along the longitudinal axis A.

Referring to FIG. 4, the first key element 120 and the second key element 130 cooperate to align the cores 108 of two optical fibers 102. For illustrative purposes, two mating optical fibers are a first optical fiber 102A including the male key element 120 and a second optical fiber 102B including the female key element 130, as described above.

The first optical fiber 102A is inserted into the fiber receiving portion 138 of the female key element 130 of the second optical fiber 102B with the male key element 120 aligned with the key recess portion 134 of the female key element 130. The key recess portion 134 of the female key element 130 is configured to receive the male key element 120 as the first optical fiber 102A is inserted into the fiber receiving portion 138 of the second optical fiber 102B. The male key element 120 and the female key element 130 are positioned to align the corresponding cores 108 of the first and second optical fibers 102A and 102B when the first and second optical fibers 102A and 102B are engaged. As such, the male and female key elements 120 and 130 are complementary and ensure that the mating optical fibers 102A and 102B are oriented to properly align the cores 108 of the fibers 102A and 102B. Once the fibers 102A and 102B are engaged, the male and female key elements 120 and 130 prevent the fibers 102A and 102B from rotating relative to each other.

Figure 7:
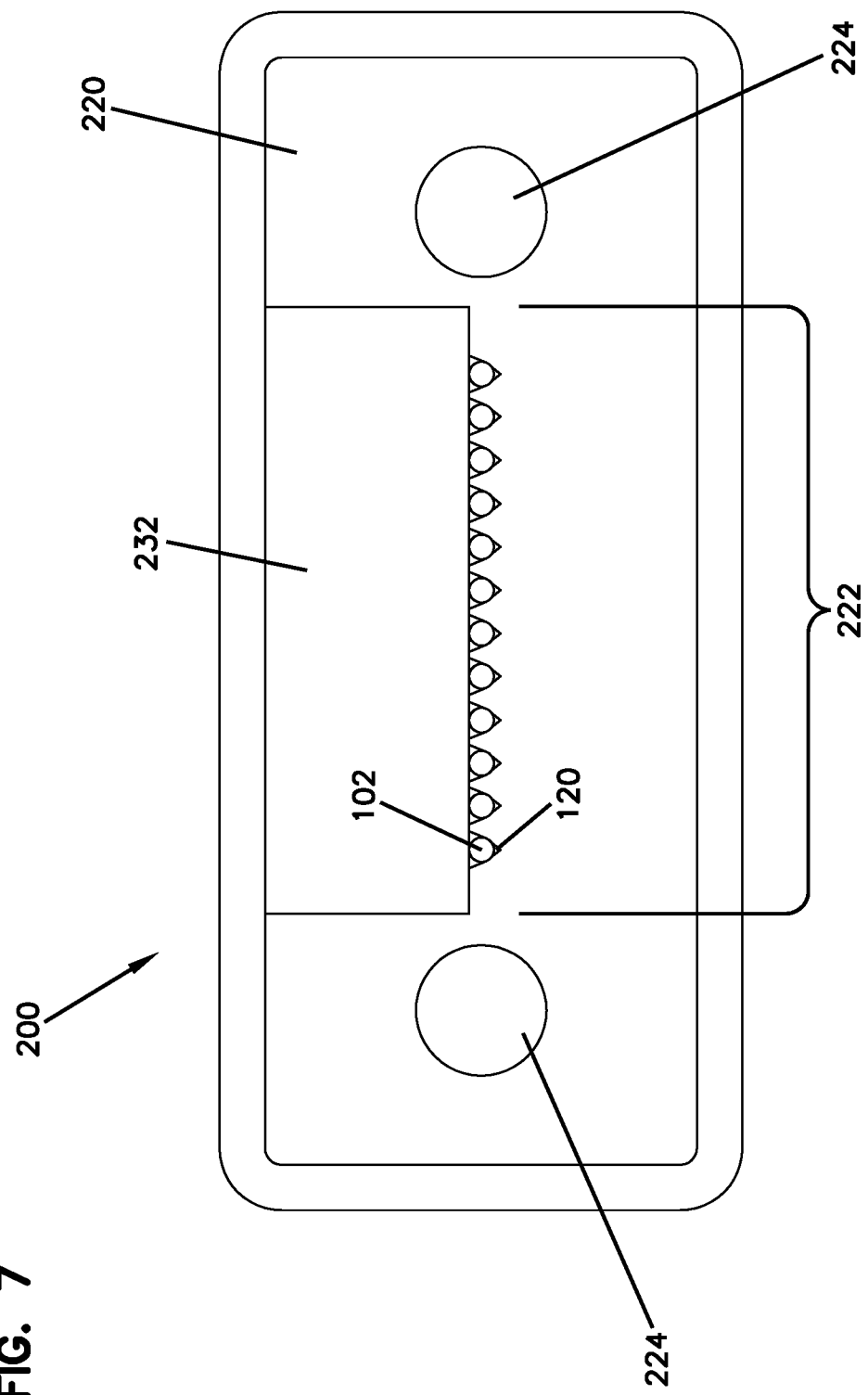
FIG. 7 is a schematic front view of the fiber optic ferrule of FIG. 5.

Referring to FIGS. 5-7, the optical fiber alignment mechanism 100 further includes a fiber optic ferrule 200 that can be used with the optical fiber 102 in accordance with the present disclosure. As described herein, the configuration of the fiber optic ferrule 200 of the present disclosure makes a molding process of the ferrule 200 easy by simplifying tolerances on the molding process. For example, the fiber optic ferrule 200 of the present disclosure has one or more fiber alignment holes having a non-rounded (or non-circular) cross-section. Such non-rounded fiber alignment holes are difficult to mold in a fiber optic ferrule. Typically, fiber alignment holes having a rounded cross-section are created with a mold having a pen that is rolled and polished. However, this technique cannot be used for non-round shaped holes. According to the present disclosure, the fiber alignment holes of the fiber optic ferrule 200 can be easily formed without relying on such existing molding techniques.

In some examples, the fiber optic ferrule 200 is a mechanical transfer (MT) ferrule for multi-fiber connections. The fiber optic ferrule 200 can hold the optical fibers 102 that are configured as described above. The optical fibers 102 can be part of a multicore fiber tape or ribbon. A polymeric matrix material that encases the optical fibers 102 of the ribbon is removed so that the optical fibers 102 are exposed, and the exposed optical fibers 102 are individually inserted into fiber alignment holes 222 through a fiber insertion opening (not shown) defined at a rearward end face 221 of the ferrule 200. In some examples, the ferrule 200 has a fiber support portion therewithin that includes a plurality of grooves formed in parallel at regular pitch, each of the grooves configured to receive and support each of the optical fibers. The present disclosure primarily describes a fiber optic ferrule 200 configured to hold a plurality of optical fibers. In other examples, however, the same principles described in the present disclosure are also applicable to a fiber optic ferrule for holding a single optical fiber.

The ferrule 200 has a ferrule body 202 and an enlarged base 204. The ferrule 200 extends between a forward end 206 and a rearward end 208 and is formed in a substantially rectangular shape. For example, the ferrule body 202 has a first main surface 210 (also referred to herein as a first major surface), a second main surface 212 (also referred to herein as a second major surface) opposite to the first main surface 210, and opposite side surfaces 214 and 216 (also referred to herein as first and second side surfaces or minor side surfaces). The first main surface 210, the second main surface 212, and the opposite side surfaces 214 and 216 extend between the forward end 206 and the rearward end 208 to define a substantially rectangular shape of the ferrule body 202.

The enlarged base 204 is provided at the rearward end 208 of the ferrule 200 and meets with the ferrule body 202 at a shoulder 218 that extends outwardly from the exterior surface of the ferrule body 202. In the illustrated example, the shoulder 218 extends from the upper, lower and opposite side surfaces 210, 212, 214 and 216 at the ferrule body 202. The shoulder 218 is a surface perpendicularly or radially extending from the exterior surface of the ferrule body 202. The shoulder 218 can be substantially parallel with a forward end face 220 of the ferrule 200. In other examples, the end face 220 can be angled relative to the shoulder 218.

As illustrated in FIGS. 5 and 6, the ferrule 200 has a forward end face 220, a plurality of fiber alignment holes 222, one or more alignment pin holes 224 (i.e., alignment holes or openings), and an adhesive window 225.

The forward end face 220 is a surface of the ferrule 200 at the forward end 206. In some examples, once the ferrule 200 is assembled with the optical fibers 102 and related components, the forward end face 220 is polished along with forward end faces of the optical fibers, thereby ensuring proper fiber-to-fiber contact and reduced signal loss. In other examples, the forward end face 220 is assembled with the optical fibers 120 and related components without such polishing beforehand or thereafter. The forward end face 220 can be angled or inclined. The forward end face 220 is a surface of the ferrule 200 that opposes a forward end face 220 of another ferrule 200 when an optical connection is made between the two mated ferrules. The forward end faces 220 of the abutting ferrules 200 are arranged opposite to each other, and alignment pins (e.g., guide pins) (not shown) are inserted into the alignment pin holes 224 so as to be interposed between opposing alignment pin holes 224.

The fiber alignment holes 222 are defined in the ferrule body 202 to be in communication with a fiber insertion opening defined at the rearward end face 221. The fiber alignment holes 222 are configured to receive and support at least portion of optical fibers, respectively, that are inserted into the ferrule body 202 through the fiber insertion opening. The fiber alignment holes 222 are open at the forward end face 220 of the ferrule body 202. When receiving the optical fibers, the fiber alignment holes 222 expose tip ends of bare fibers at the forward end face 220.

The plurality of fiber alignment holes 222 is arranged along a line at the forward end face 220 of the ferrule 200 so as to form a row of optical fibers. The plurality of fiber alignment holes 222 can be arranged multiple lines such as two lines.

Each of the fiber alignment holes 222 includes a keyway 226 configured to receive a key element (such as the male key element 120) of the optical fiber 102 when the optical fiber 102 is received the fiber alignment hole 222. In some examples, the keyway 226 is shaped to be complementary to the key element (e.g., the key element 120, 130) of the optical fiber 102.

One or more alignment pin holes 224 are provided at the forward end face 220 of the ferrule 200 to receive guide pins (not shown) that are configured to align two mating ferrules 200. The alignment pin holes 224 can also referred to herein as guide pin holes. In the illustrated example, the alignment pin holes 224 can be formed in a substantially circular shape in cross-section in a perpendicular direction relative to an inserting direction of a guide pin. Other cross-sectional shapes of the alignment pin holes 224 are possible in other examples. In the illustrated example, the ferrule 200 has two alignment pin holes 224. In other examples, however, the ferrule 200 has a single alignment pin hole or more than two alignment pin holes.

The adhesive window 225 is provided on the upper surface 210 of the ferrule 200 and in communication with at least a portion of the fiber alignment holes 222 within the ferrule body 202. The adhesive window 225 is configured to receive adhesive (e.g., epoxy adhesive) to fix the optical fibers to the fiber alignment holes 222.

With reference to FIGS. 6 and 7, the ferrule body 202 is formed with two separate pieces. In some examples, the ferrule body 202 includes a fiber support portion 230 and a cover portion 232. The fiber support portion 230 is configured to hold one or more optical fibers 102 thereon. The fiber support portion 230 includes one or more fiber channels or passages 234 on which the optical fibers 102 is at least partially received and supported. In the illustrated example, the fiber support portion 230 includes a cavity 236 to which the cover portion 232 is received. When the cover portion 232 is inserted into the cavity 236 of the fiber support portion 230, the cover portion 232 is arranged on the passages 234, and the fiber alignment holes 222 are defined by the passages 234 and the cover portion 232.

In some example, the keyway 226 of the fiber alignment hole 222 is formed integrally with the passage 234 and shaped to be complementary to the shape of the key element (e.g., the male key element 120) of the optical fiber 102. Where the key element of the optical fiber 102 is a V-shaped protrusion, as illustrated in FIG. 8, the keyway 226 of the fiber alignment hole 222 can be a V-shaped groove corresponding to the V-shaped key element of the optical fiber 102.

The cover portion 232 can include a flat engaging surface 240 configured to close the passages 234 when the cover portion 232 is received to the cavity 236 of the fiber support portion 230. As such, the fiber alignment holes 222 are defined by the passages 234 of the fiber support portion 230 and the flat engaging surface 240 of the cover portion 232.

Figure 8:
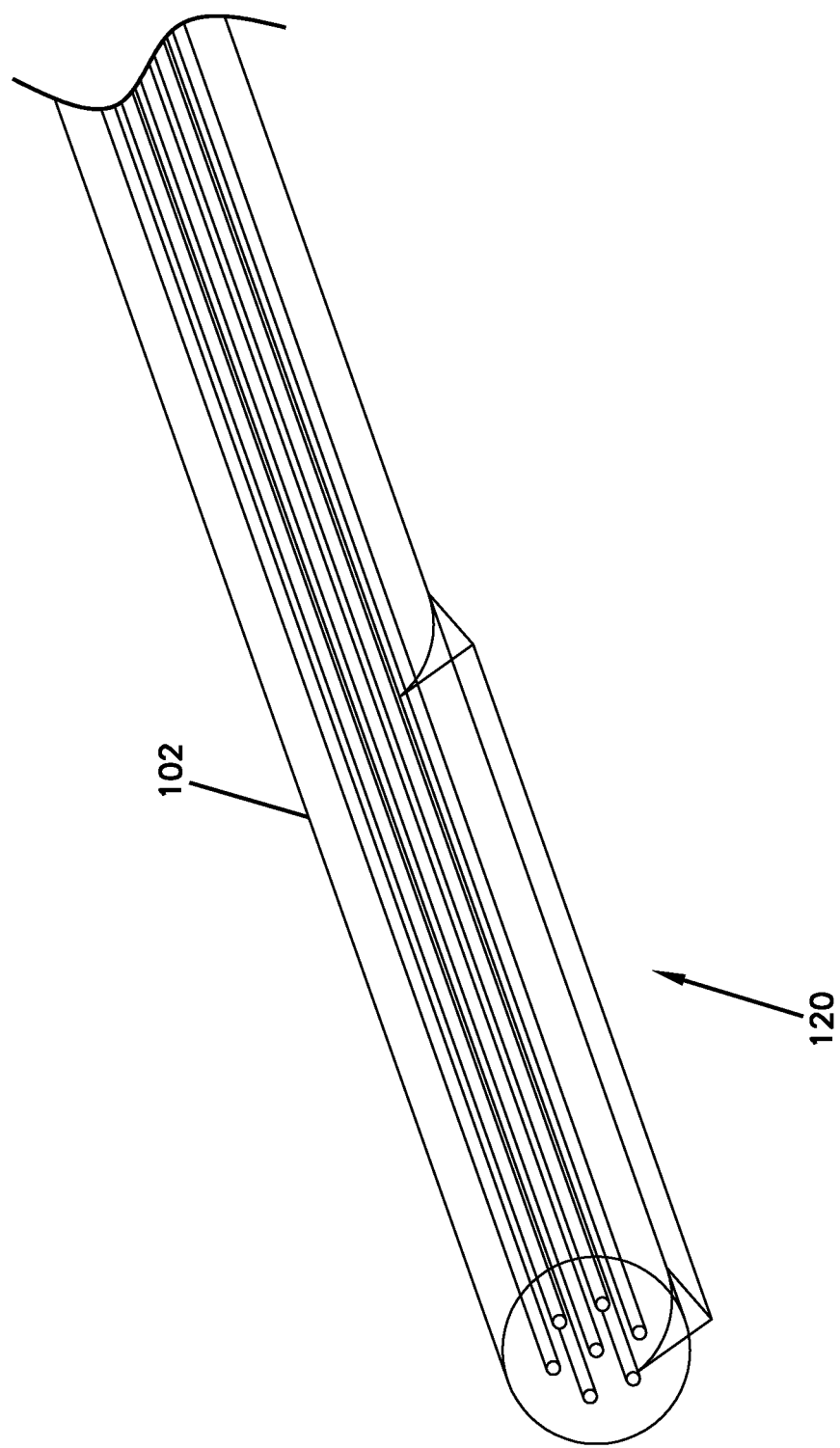
FIG. 8 schematically illustrates another example of a male key element of the optical fiber alignment mechanism in accordance with the present disclosure.
Figure 9B:
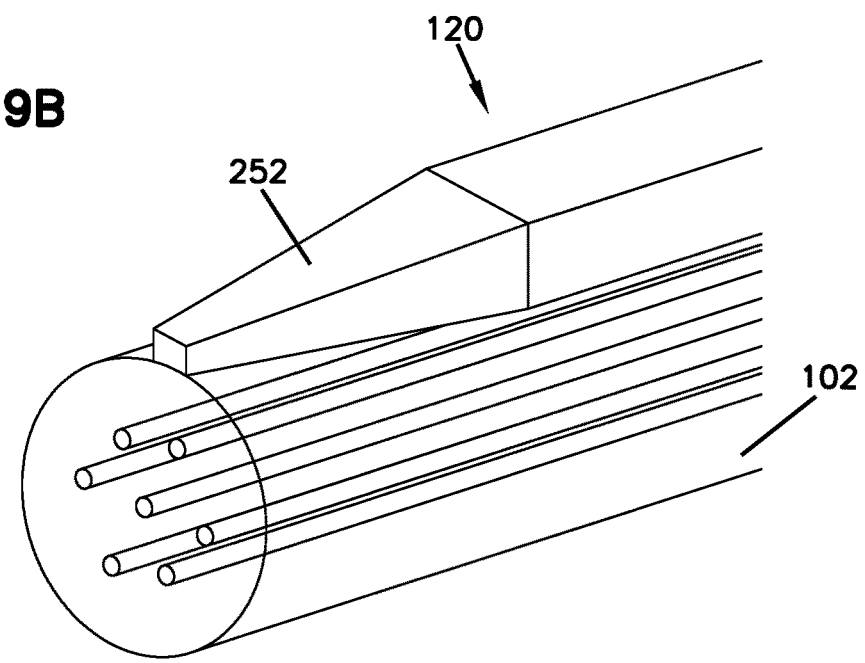
FIG. 9B illustrates a forward end of the male key element of FIG. 9A.
Figure 9C:
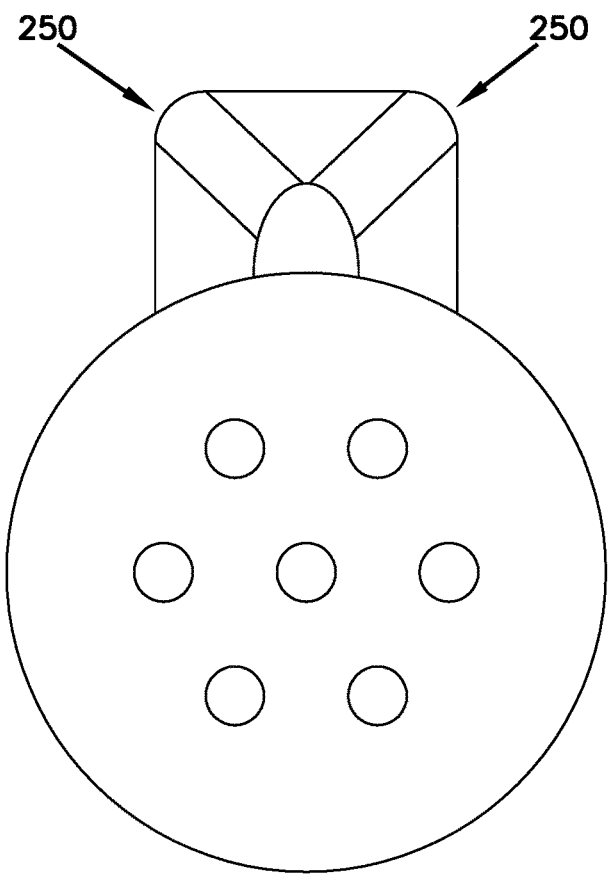
FIG. 9C is a schematic front view of the male key element of FIG. 9A.

FIG. 8 schematically illustrates another example of the male key element 120 of the optical fiber 102 in accordance with the present disclosure. In this example, the male key element 120 has a V-shaped cross-section. In some examples, the V-shaped key element 120 of the optical fiber 102 can correspond to the keyway 226 of the fiber alignment hole 222 of the ferrule 200 where the keyway 226 is a V-shaped groove provided to the fiber alignment hole 222 (or the passage 234). The V-shaped key element 120 of the optical fiber 102 and the V-shaped keyway 226 of the fiber alignment hole 222 of the ferrule 200 can properly orient the optical fiber 102 within the ferrule 200 when the optical fiber 102 is inserted into the fiber alignment hole 222 of the ferrule 200.

FIGS. 9A-9D schematically illustrate yet another example of the male key element 120 of the optical fiber 102 in accordance with the present disclosure. In this example, the male key element 120 has chamfered or curved edges 250 and a tapered forward end 252. The top longitudinal edges 250 of the male key element 120 are chamfered or curved to allow easy assembly of the optical fiber 102 with another optical fiber 102 or with the ferrule 200. Further, the male key element 120 has a forward end 252 that is tapered toward the first end 104 of the optical fiber 102. The tapered forward end 252 helps insertion of the optical fiber 102 into the female key element 130 of another optical fiber 102, or into the fiber alignment hole 222 of the ferrule 200.

In some examples, the key elements 120, 130 as illustrated in FIGS. 1-4, 8, and 9A-9D can be printed on the cladding 112 by 3-D printing. In other examples, the key elements 120, 130 of FIGS. 1-4, 8, and 9A-9D can be formed by molding and post-molding treatment. For example, a round or cylindrical is molded together with the rest of the optical fiber 102, and then treated to change its round or cylindrical shape into, e.g., a square cross section. Such a post-molding treatment includes laser ablation or diamond turning. Other post treatments can be used to shape the key elements 120, 130 after molding.

Figure 10:
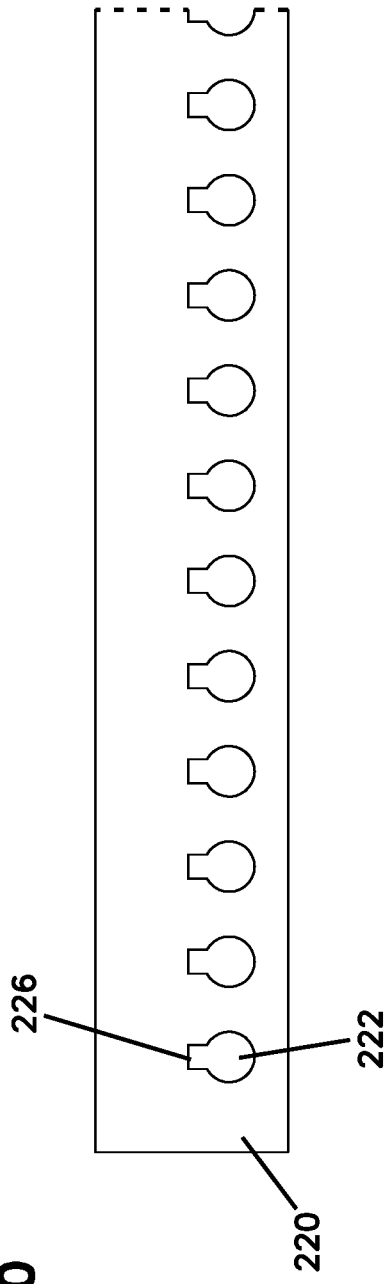
FIG. 10 schematically illustrates another example of a keyway of the fiber optic ferrule in accordance with an exemplary embodiment of the present disclosure.

FIG. 10 schematically illustrates another example of the keyway 226 of the ferrule 200. In this example, the keyway 226 is a rectangular slot provided to the fiber alignment hole 222. In some example, the ferrule body 202 is integrally made in a single piece without the cover portion 232 as described in FIGS. 5-7.

In some examples, the keyway 226 as illustrated in FIGS. 5-7 and 10 can be formed by molding and subsequent treatment. For example, a groove is molded together with the rest of the ferrule 200, and then treated to change its molded shape into any desired shape, such as V-shaped groove or rectangular slot as illustrated in FIGS. 5-7 and 10.

Figure 11:
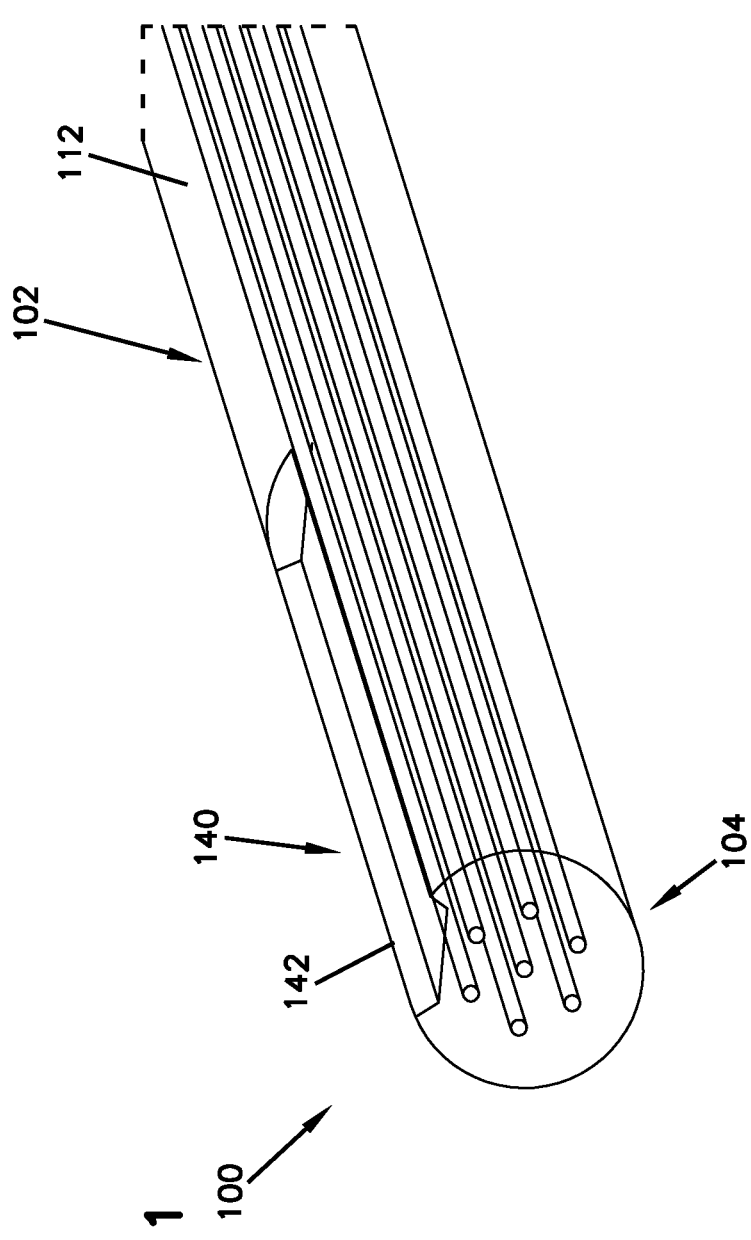
FIG. 11 schematically illustrates yet another exemplary embodiment of the optical fiber alignment mechanism in accordance with the present disclosure.

Referring to FIGS. 11 and 12, yet another example of the optical fiber alignment mechanism 100 is described. In this example, the optical fiber alignment mechanism 100 includes a key element 140 that is integrally formed with the optical fiber 102 to provide a non-symmetrical cross-section of the optical fiber 102. In some examples, the optical fiber 102 is manufactured by extrusion with such a non-symmetrical cross-sectional profile.

FIG. 11 schematically illustrates yet another example of the optical fiber alignment mechanism 100 in accordance with the present disclosure. In this example, the optical fiber alignment mechanism 100 includes a key element 140 configured as a groove 142 that is integrally formed with the cladding 112. The groove 142 results in a non-circular, non-symmetrical cross-sectional profile of the optical fiber 102, which enables a proper orientation of the optical fiber 102 relative to a mating optical fiber or a ferrule and can thus align the cores of the optical fiber 102 to the corresponding cores of the mating optical fiber. In some examples, the groove 142 is provided only a portion of the cladding 112, for example adjacent the first end 104 of the optical fiber 102. In other examples, the groove 142 is formed along the entire length of the optical fiber 102.

FIGS. 12A and 12B schematically illustrate yet another example of the optical fiber alignment mechanism 100 in accordance with the present disclosure. In this example, the key element 140 of the optical fiber alignment mechanism 100 includes one or more projections 144 (also referred to herein as male key elements or bumps) that are integrally formed with the cladding 112. The projections 144 can be formed together with the optical fiber 102 (or the cladding 112 thereof) by extrusion. Other manufacturing processes can be used in the examples.

In some examples, the projections 144 are formed along the entire length of the optical fiber 102. In other examples, the projections 144 are provided only a portion of the cladding 112, for example adjacent the first end 104.

The projections 144 are arranged and spaced apart from each other on a circumference of the cladding 112 such that the optical fiber 102 has a non-symmetrical cross-sectional profile. As described above, the non-symmetrical cross-sectional profile of the optical fiber 102 allows proper alignment of the cores 108 of the optical fiber 102 with corresponding cores of another optical fiber, or with the fiber alignment holes 222 of the ferrule 200.

The various examples and teachings described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

LIST OF REFERENCE NUMERALS AND CORRESPONDING FEATURES 100 optical fiber alignment mechanism
102 optical fiber
102A first optical fiber
102B second optical fiber
104 first end
106 second end
108 cores
110 end face
112 cladding
120 first key element
130 second key element
132 base portion
134 key recess portion
136 opposing end surfaces
138 fiber receiving portion
140 key element
142 groove
144 projections
200 fiber optic ferrule
202 ferrule body
204 enlarged base
206 forward end
208 rearward end
210 first main surface
212 second main surface
214 side surfaces
216 side surfaces
218 shoulder
220 forward end face
221 rearward end face
222 fiber alignment holes
224 alignment pin holes
225 adhesive window
226 keyway
230 fiber support portion
232 cover portion
234 passages
236 cavity
240 flat engaging surface
250 curved edges
252 forward end

What is claimed is:

1. A method of manufacturing an optical fiber, comprising:
providing a cladding, the cladding being elongate along a longitudinal axis of the cladding, the cladding being positioned around a circumference of a plurality of cores for transmitting optical signals, the cladding including an outer cylindrical surface; and
3-D printing a key element directly on the outer cylindrical surface of the cladding, the key element being configured to engage with a corresponding element to align the cores with corresponding cores of another optical fiber.

2. The method of claim 1, wherein the 3-D printing includes two photon polymerization 3-D printing.

3. The method of claim 1, wherein the 3-D printing includes bringing into contact a high numeral aperture microscopic objective with a photoresist.

4. The method of claim 3, wherein the photoresist is solvent free.

5. The method of claim 3, further comprising irradiating the photoresist such that the photoresist polymerizes.

6. The method of claim 5, wherein the irradiating is performed with a laser.

7. The method of claim 1, wherein the key element includes an inorganic-organic hybrid polymer.

8. The method of claim 1, wherein the key element is a male key element configured to engage with a corresponding female element of the another optical fiber.

9. The method of claim 1, wherein the cores are symmetrically arranged in the cladding about an axis of the optical fiber.

10. The method of claim 1, further comprising twisting the cladding such that each of the cores forms a helix within the cladding around the longitudinal axis of the optical fiber.

11. The method of claim 1, wherein the key is a projection protruding from the outer cylindrical surface of the cladding.

12. The method of claim 1, wherein the key element is positioned adjacent an end of the cladding.

13. The method of claim 1, wherein the key element is a first key element adjacent a first longitudinal end of the cladding, the method further comprising 3-D printing a second key element directly on the outer cylindrical surface of the cladding at a second longitudinal end of the cladding, the second longitudinal end being opposite the first longitudinal end.

14. The method of claim 1, further comprising:
providing a ferrule body having a fiber alignment hole, the fiber alignment hole including a keyway that is complementarily shaped to the key element; and
positioning the fiber in the fiber alignment hole, such that the key element engages the keyway.

15. The method of claim 14, wherein the keyway is a V-shaped groove and the key element is a V-shaped protrusion.

16. The method of claim 14, further comprising treating a groove of the ferrule body to change a shape of the groove and thereby form the fiber alignment hole.

17. The method of claim 1, wherein the key element has a tapered forward end and chamfered or curved edges.

18. The method of claim 1, further comprising, prior to the 3-D printing, forming the cladding by an extrusion process.

19. A method of manufacturing an optical fiber, comprising:

providing a cladding, the cladding being elongate along a longitudinal axis of the cladding between a first longitudinal end and an opposite second longitudinal end of the cladding, the cladding having an outer surface and being positioned circumferentially around a core for transmitting optical signals;

3-D printing a first key element having a first structural configuration directly on the outer surface of the cladding adjacent the first longitudinal end; and 3-D printing a second key element having a second structural configuration directly on the outer surface of the cladding adjacent the second longitudinal end, the first and second structural configurations being different from each other.

20. The method of claim 19, wherein the first and second structural configurations are complementary to each other.

\* \* \* \* \*